United States Patent [19]

Pierce et al.

[11] 4,121,868

[45] Oct. 24, 1978

[54] CAM ACTUATED PIVOTAL JAW GRIPPING APPARATUS

[76] Inventors: Ray E. Pierce, 7770 SW. 89th, Portland, Oreg. 97223; Gary J. Shaffer, 6825 SW. Wilson St., Beaverton, Oreg. 97005; Roger L. Belanger, 5 Clearwater Crescent., Apt. 104 Snow Bird Manor, Fort McMurray, Alberta, Canada, T9H 2B7

[21] Appl. No.: 777,145

[22] Filed: Mar. 14, 1977

[51] Int. Cl.² ............................................. B66C 1/42
[52] U.S. Cl. .................................... 294/116; 294/95; 279/37
[58] Field of Search ...................... 294/116, 114, 86.3, 294/94, 95; 279/107, 37, 57, 71

[56] References Cited

U.S. PATENT DOCUMENTS

| 3,905,636 | 9/1975 | Westerlund | 294/116 |
| 4,032,163 | 6/1977 | Holt | 279/37 |

Primary Examiner—James B. Marbert
Attorney, Agent, or Firm—Chernoff & Vilhauer

[57] ABSTRACT

A gripping apparatus for lifting objects remotely utilizing three pivotally mounted gripping arms driven by integral cam followers located on extremities and roller grasping means located on their opposite extremities. The cam followers are carried in tracks, located in a rotatable can which moves the gripping arms and rollers inwardly or outwardly upon rotation of the cam by a remotely controlled bi-directional electric motor. A positioning cone centers the gripping arms over the load to be gripped thereby preventing an unsymmetrical grip which could cause inadvertant or premature release of the load. A bottom limit switch senses tension in the cables upon which the apparatus is suspended to prevent activation of the gripping fingers unless the apparatus is fully lowered, and an inertia switch senses rotation of the apparatus for preventing excessive torque on the cam by reactive torque of the motor which could cause the entire apparatus to twist.

12 Claims, 9 Drawing Figures

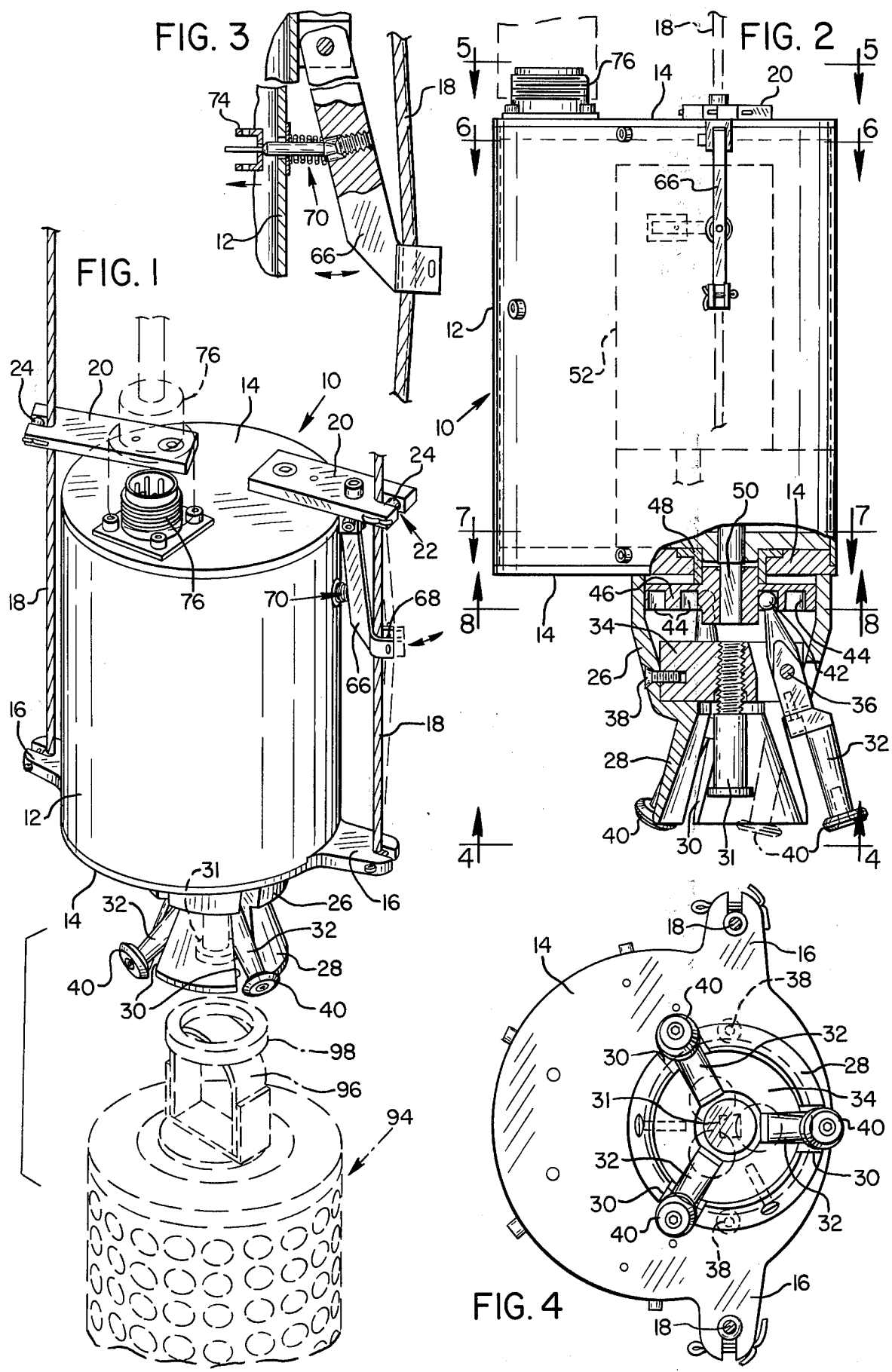

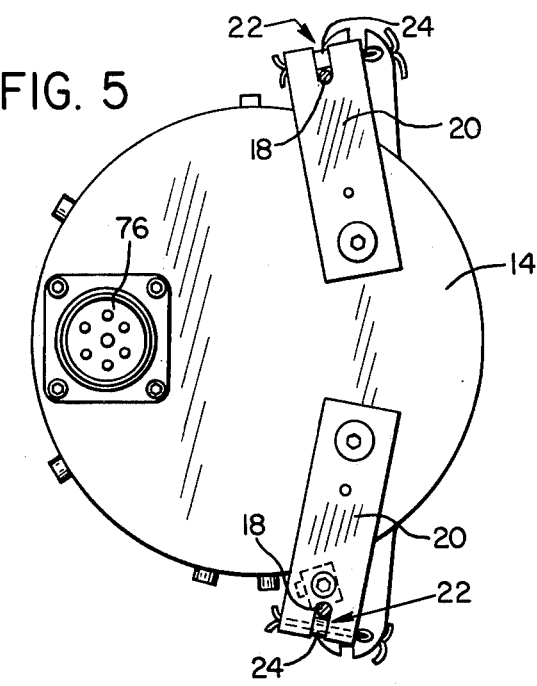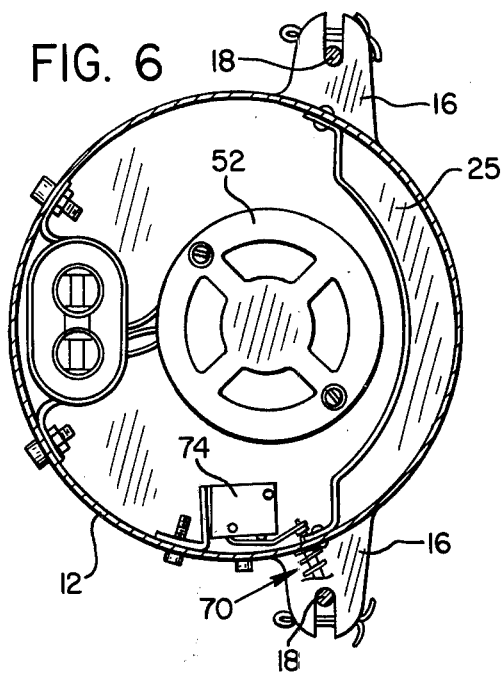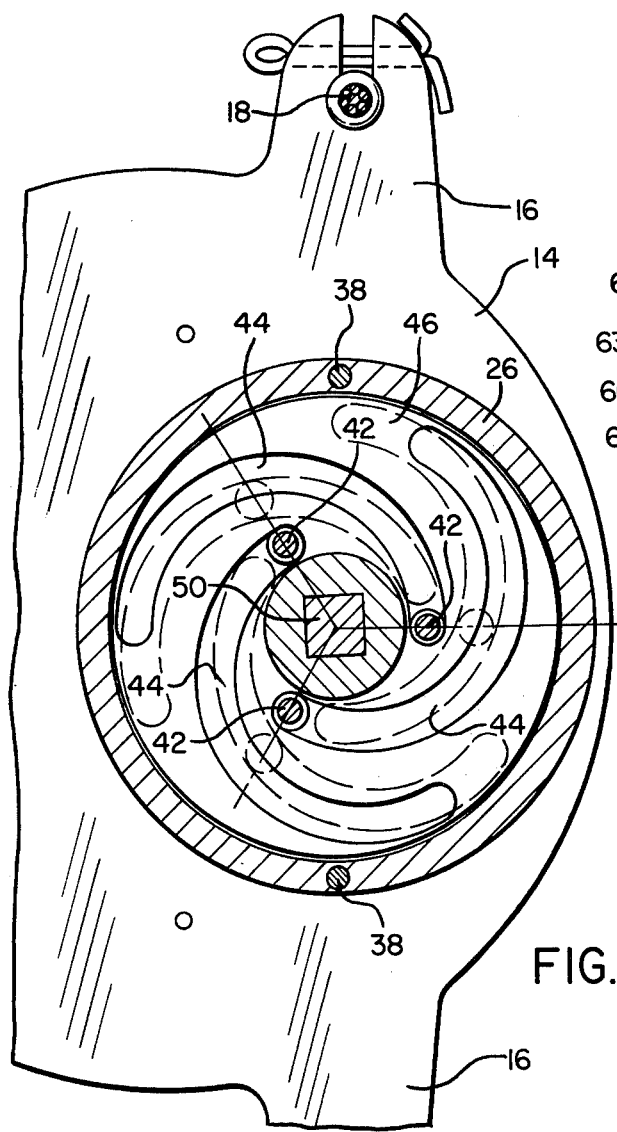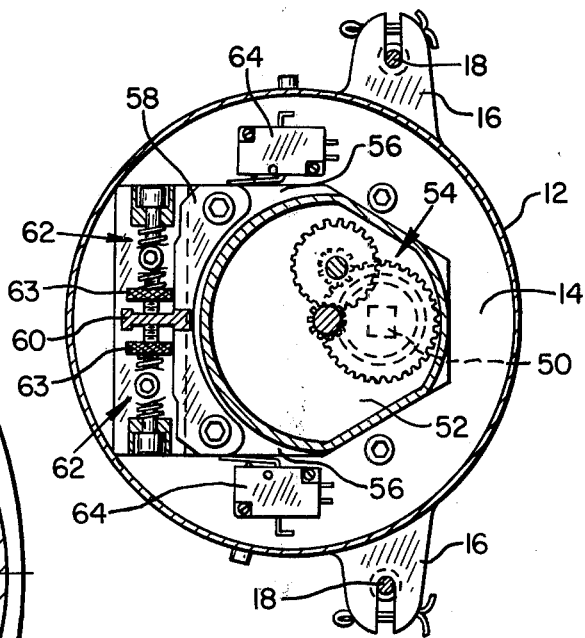

CAM ACTUATED PIVOTAL JAW GRIPPING APPARATUS

BACKGROUND OF THE INVENTION

The present invention relates to a gripping apparatus for lifting a load remotely. It pertains in particular to such a gripping apparatus with cam operated gripping arms.

In many instances it is desirable to grip and transport an article by remote control. This particularly is evident in the nuclear reactor industry where radioactively contaminated filter elements must be relocated when expended.

Many prior art devices are known for this purpose. However, the prior art gripping devices use gripping arms which are not displaceable positively and reliably controllable in both directions. Therefore, if the load is jolted or in the case of power failure or other emergency, the gripping arms may lose their grip and drop the object being transported. Alternatively, the arms may not reliably turn loose of the load when desired. Also, being single directional with respect to grip application, the prior art devices cannot be used for gripping objects both from within and without.

SUMMARY OF THE PRESENT INVENTION

In its basic concept, the gripping apparatus of this invention comprises a bi-directionally rotatable cam configured for moving pivotally mounted gripping arms positively inwardly or outwardly thereby mechanically locking the arms in any position for gripping and releasing an object either from within or from without.

It is by virtue of the foregoing basic concept that the principal objective of this invention is achieved; namely, to overcome the aforementioned disadvantages and limitations of the prior art gripping apparatus.

It is another object of this invention to provide such a gripping apparatus which has provisions for centering itself with respect to the object to be lifted.

It is a further objective of this invention to provide such a gripping apparatus which will grip irregularly shaped objects.

It is a further objective of this invention to provide such a gripping apparatus wherein the gripping arms cannot be activated inwardly or outwardly if there is tension on the cables which support the apparatus.

It is a still further objective of this invention to provide such a gripping apparatus wherein excessive positive force on the gripping arms, and reactive twisting of the mounting platform upon which the apparatus is mounted, is prevented.

It is a still further objective of this invention to provide such a gripping apparatus which is simple to operate and which is fail safe.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIG. 1 is a perspective view of the gripping apparatus of the present invention.

FIG. 2 is an elevation view of the gripping apparatus of FIG. 1 partially broken away to show hidden detail.

FIG. 3 is a fragmentary sectional view of the tension-responsive actuation lever of the gripping apparatus of FIG. 1.

FIG. 4 is a bottom view taken along the line 4—4 of FIG. 2.

FIG. 5 is a top view taken along the line 5—5 of FIG. 2.

FIG. 6 is a sectional view taken along the line 6—6 of FIG. 2.

FIG. 7 is a sectional view taken along the line 7—7 of FIG. 2.

FIG. 8 is a sectional view taken along the line 8—8 of FIG. 2.

DESCRIPTION OF THE PREFERRED EMBODIMENT

Figure 9:
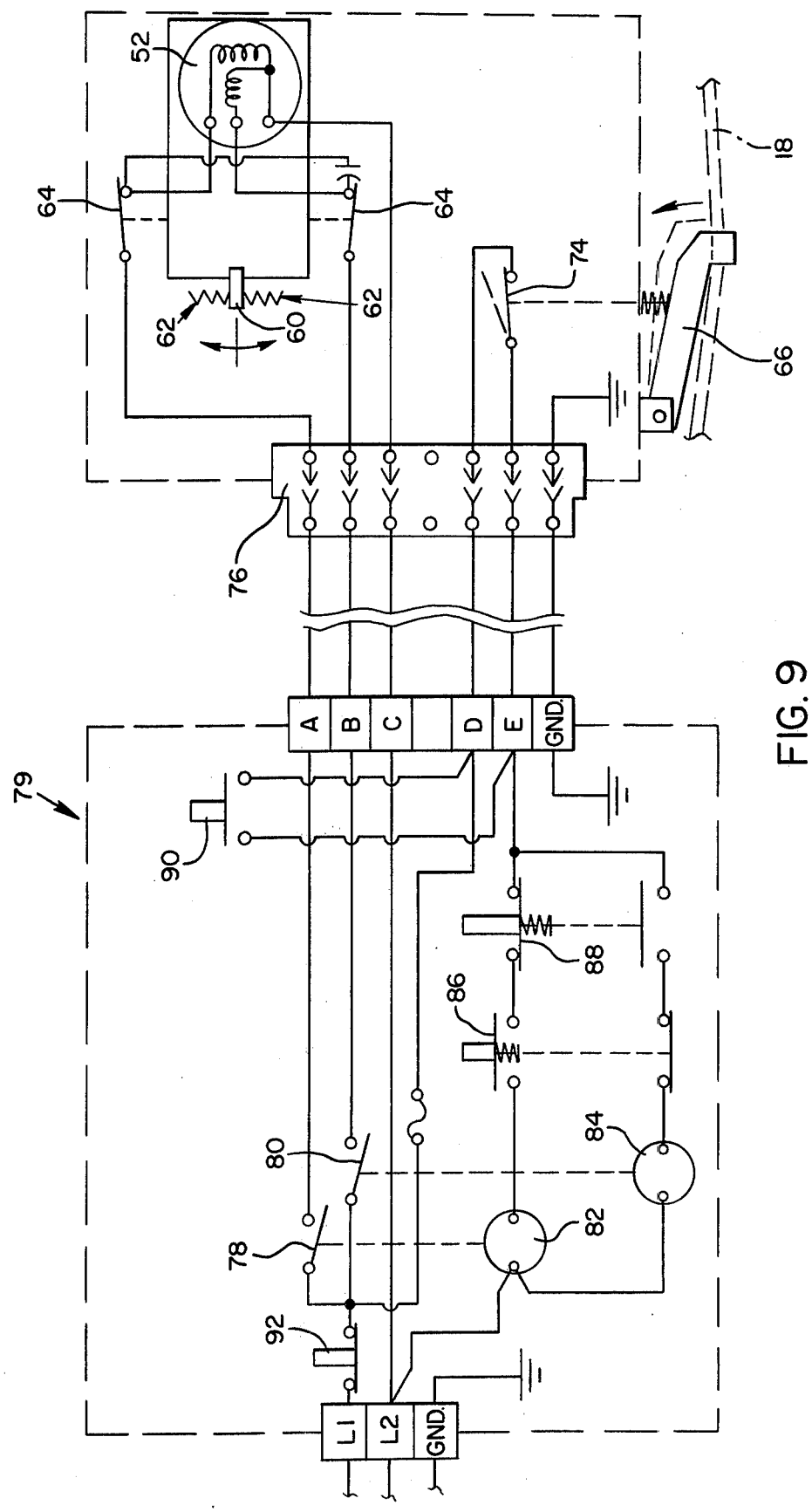
FIG. 9 is a diagrammatic view showing the electrical circuitry of the invention.

Referring to FIG. 1 of the drawings the apparatus of the present invention includes a mounting platform 10 which mounts the operative elements of the apparatus. The mounting platform comprises a hollow cylinder 12 enclosed at each end by circular end plates 14. The lower end plate has integral wings 16 which extend outwardly from each side.

The mounting platform is mounted for vertical movement on paired suspended cables 18 which are attached at their ends to wings 16. Thus they are spaced outwardly of cylinder 12. To this end spreader bars 20 are attached to the upper end plate 14 aligning the cables vertically. The cables are retained slideably in slots 22 located in the ends of the spreader bars by means of rollers 24 which are carried in the slots. Since the wings, and thus the cables, are offset from the center line of the mounting platform, a counterweight 25, FIG. 6, is attached to the inside of cylinder 12 so that the apparatus will hang vertically.

It will be appreciated that the gripping apparatus of the present invention is not limited to being mounted on vertical cables. For example, it also could be mounted on the extremity of a remotely controlled arm having multiple degrees of movement.

Referring now to FIGS. 1 and 2, attached to the lower end plate is a generally cylindrical cover 26 which terminates in a hollow conic positioner 28. The cover and positioner extend downwardly from the mounting platform and the positioner is divided into three equally spaced segments by means of slots 30. Extending downwardly from the apparatus centrally in positioner 28 is a support pad 31.

Mounted pivotally to the cover in slots 30 are elongate gripping arms 32. The gripping arms are joined pivotally intermediate their ends to a pivot block 34 by means of respective pivot pins 36. The pivot block in turn is secured to cover 26 by means of screws 38 (FIG. 4). The gripping arms are constructed in two pieces which are offset from one another to facilitate manufacturing and disassembly.

Mounted on the lower extremity of each of the gripping arms is a grasping means, such as roller 40. The rollers are mounted rotatably substantially normal to the respective ends of the gripping arms and are of sufficient diameter to extend laterally from the respective ends. They are of relatively thin, disc-like configuration with tapered side walls to facilitate positioning them under the object to be gripped, and to prevent metal gauling between the gripping arms and filter element annular lifting ring 98.

Located on the upper extremities of the gripping arms are spherical cam followers 42. The respective cam followers slideably fit in respective arcuate tracks 44 which are located in the bottom surface of a rotatable cam 46. As best shown in FIG. 8, there are three tracks, one for each gripping arm. Each extends over approximately a 180° arc and radiates outwardly at a constantly increasing diameter from the axis of rotation of the cam 46. Thus, when each cam follower is at the inner end of its track, shown as the solid line positions in FIG. 8, the roller 40 of its associated arm 32 is positioned at a radially outward position; and when each cam follower is at a more outwardly portion of its track, shown as the phantom line positions in FIG. 8, the roller of its associated arm is positioned at a radially more inward position.

To enable this movement of the gripping arms, the cam 46 is journeled into the mounting platform by means of bushing 48, FIG. 2, and drivingly slip fitted to a drive shaft 50 which is driven rotatably by a bi-directional electric motor 52, FIG. 2. A gear reduction unit 54, FIG. 7, interconnects the motor and the drive shaft so that the cam is rotated slowly.

The motor 52 mounted on the mounting platform 10 by the bushing 48 is free to rotate in order that its operation can be automatically interrupted if the motor starts to apply excessive reactive torque to the platform 10 in either direction in reaction to the torque which it applies to the cam 46. Referring to FIG. 7, a plate 56 is mounted to the motor 52. A bracket 58 which is attached to plate 56 has an outwardly extending tab 60. The tab is engaged on each side by adjustable spring-biased shock absorbers 62 which in turn are mounted to the mounting platform end plate 14. Thus, the rotation of the motor relative to the mounting platform is yieldably limited in both directions and the amount of reactive torque required to cause relative rotation to these limits can be preset by threaded adjuster nuts 63 which vary the compression in the shock absorber springs.

Mounted on the mounting platform on either side of plate 56 are limit switches 64. They are arranged so that they will be contacted by the plate 56 when the motor is rotated against either shock absorber 62 past a predetermined angle. The limit switches are connected to the motor power supply for interrupting its operation when they are contacted, as will be more fully explained later.

Mounted pivotally below one of the spreader bars is an actuator lever 66, FIGS. 1 and 3. The outer end of the actuator lever defines a slot 68 through which one of the cables 18 passes. When the cable is not in tension, the actuator lever is urged outwardly from the mounting platform by biasing means, such as a spring 70, so that the cable is deflected outwardly as shown in FIG. 3 and the phantom lines of FIG. 1. A bottom limit switch 74, FIGS. 3 and 6, is connected to the actuator lever in a manner for interrupting operation of motor 52 upon depression of the actuator lever inwardly against spring 70 when the cable is placed in tension. Thus the motor will operate in either direction only when the apparatus is resting on support pad 31 with no tension in the cables. The slack cable also signals the hoist lowering the apparatus to stop (not shown).

Power for operation of the motor passes into the mounting platform through a connector 76. Referring to FIG. 9 the controls 79 for remote operation of the gripping apparatus are located on a suitable control panel (not shown). The positive power line L 1 is split into two paths A and B for supplying power to the two positive poles of the motor 52 for controlling its operation in either direction. Main power switches 78 and 80 are located in paths A and B respectively for operation of the motor in the preferred direction. The switches are activated remotely by relay solenoids 82 and 84 through push button control switches 86 and 88 respectively. The push button switches 86 and 88 are spring loaded to a normally open position. It will be noted that the push button switches also are interconnected with both solenoids 82 and 84 so that simultaneous deflection of the switches will cause an open circuit for both solenoids rather than short out the motor.

Current for operating relay solenoids 82 and 84 passes through bottom limit switch 74 which is activated by actuation lever 66. Thus the motor can be operated only when the apparatus is resting on support pad 31 with cables 18 not in tension. A manual override switch 90 bypasses the bottom limit switch 74 for operation of the motor if the bottom limit switch malfunctions or for testing of the unit.

A safety stop switch 92 is connected in series in the main power line for shutting off the motor in case of an emergency.

Operation

Having thus described our invention in a preferred embodiment its operation may be more fully understood.

With the gripping arms 32 spread apart in their fully outward positions the apparatus is lowered by extending cables 18 in the conventional manner. The apparatus is shown in FIG. 1 suspended above a radioactively contaminated water filter element 94 which is used in a nuclear reactor fluid system. The filter has a bracket 96 with an annular lifting ring 98 attached to it for facilitating its being lifted.

As the apparatus is lowered it is centered over the lifting ring 98 by means of conic positioner 28. When properly positioned the apparatus is supported by support pad 31 which rests on the top of bracket 96 and/or lifting ring 98 thus relieving cables 18 of any tension and closing switch 74 thereby enabling power supply to relay solenoids 82 and 84. It will be noted that the apparatus will not operate until it is fully lowered with the support pad 31 positioned on bracket 96 and/or lifting ring 98. Thus the apparatus cannot inadvertenly be operated once the rollers are correctly positioned relative to the object to be gripped.

Motor 52 is operated by depressing the appropriate push button control switch 86 or 88 to rotate cam 46 clockwise (looking from below) thus moving cam followers 42 outwardly in tracks 44. Accordingly, gripping arms 32 are pivoted about pins 36 forcing rollers 40 inwardly over the bottom surface of lifting ring 98. Once the rollers are seated, the push button control switch is either deactivated manually or the appropriate limit switch 64 automatically opens, interrupting power to the motor 52. Thereafter the apparatus and filter element can be lifted and relocated in the conventional manner.

If the operator should deactivate the push button control switch before the rollers are seated fully, or if power to the apparatus is interrupted, the shape of the cam tracks 44 and the reduction gearing 54 serves as a positive lock to prevent the gripping arms from reopening and dropping the load. If the operator should continue to activate the control switch after the rollers are seated fully, causing the motor 52 to rotate excessively relative to the mounting platform because of reactive torque, the motor will open one of the limit switches 64 and become de-energized.

Once the apparatus and filter element has been positioned properly by manipulation of the cable, the gripping arms can be reopened by actuating the opposite control push button and rotating the cam counterclockwise to spread the arms 32. Again the gripping arms cannot be moved to release the object unless the apparatus and filter element are supported fully so that there is no tension on the cables.

It will be noted that the shape of the rollers allows them alternately to be located within an object and the arms spread outwardly to engage it from within.

In case one of the switches or relay solenoids should fail to respond while the motor is operating, the entire control circuit can be de-activated by depressing safety stop switch 92.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A gripping apparatus comprising:
   (a) a mounting platform;
   (b) a plurality of gripping arms each connected pivotally at a location intermediate their ends to the mounting platform;
   (c) each of the gripping arms having a grasping means located at one of its extremities and a cam follower located at its opposite extremity;
   (d) a cam mounted rotatably on the mounting platform and having respective multiple track means formed therein, each for engaging a respective one of said cam followers in a manner such that rotation of the cam in one direction causes simultaneous outward spreading of the grasping means and rotation of the cam in the opposite direction causes simultaneous inward closing of the grasping means respectively; and
   (e) motor means on the mounting platform for rotating the cam selectively in either of the two rotational directions.

2. The gripping apparatus of claim 1 including means for moving the mounting platform vertically.

3. The gripping apparatus of claim 2 wherein the means for moving the mounting platform vertically comprises suspended cables attached to the mounting platform.

4. The gripping apparatus of claim 3 including means responsive to tension in at least one of the cables for preventing actuation of the motor means when the cable is in tension.

5. the gripping apparatus of claim 4 wherein the means for preventing actuation of the motor means comprises:
   (a) an actuator lever pivotally attached to the mounting platform and configured for passing one of the cables through its outer extremity;
   (b) biasing means interconnecting the actuator lever and the mounting platform in a manner for normally urging the actuator lever transversely against the cable so that said cable normally is deflected from vertical; and
   (c) switching means connected to the actuator lever and to said motor means for deactivating said motor means when the tension in said cable is sufficient to move the actuator lever transversely against the biasing means.

6. The gripping apparatus of claim 1 wherein the grasping means comprise respective disc-like rollers which are mounted rotatably substantially normal to the ends of the gripping arms.

7. The gripping apparatus of claim 1 wherein said motor means comprises:
   (a) a bi-directional electric motor; and
   (b) switches associated with the electric motor in a manner for passing current to the motor to rotate it selectively in either of the two rotational directions.

8. The gripping apparatus of claim 7 including means responsive to the torque applied by said motor means to said cam for preventing actuation of said motor means when said torque exceeds a predetermined amount.

9. The gripping apparatus of claim 8 wherein the means for preventing actuation of said motor means comprises:
   (a) means for mounting said motor means rototably to the mounting platform;
   (b) biasing means for yieldably resisting relative rotation between the motor means and mounting platform;
   (c) switching means mounted on the platform in a manner such that they are engaged by the motor means when it rotates with respect to the mounting platform beyond a predetermined angle; and
   (d) means connecting the switching means to the motor means for de-activating the motor means when the switching means are engaged by the motor means.

10. The gripping apparatus of claim 1 including three of said gripping arms equally spaced radially from one another.

11. The gripping apparatus of claim 1 including a hollow conic positioner extending from the mounting platform co-extensive with the gripping arms for centering the gripping arms about the object to be gripped.

12. The gripping apparatus of claim 11 wherein the conic positioner is segmented for allowing passage of the gripping arms between adjacent segments.

* * * * *